United States Patent [19]

Shannon et al.

[11] 3,926,653

[45] Dec. 16, 1975

[54] METHOD OF BUILDING AND MAINTAINING SLURRY CONSISTENCY

[75] Inventors: Richard F. Shannon, Lancaster; Jerry L. Helser, Hebron, both of Ohio

[73] Assignee: Owens-Corning Fiberglas Corporation, Toledo, Ohio

[22] Filed: Feb. 21, 1974

[21] Appl. No.: 444,460

[52] U.S. Cl. .............................. 106/119; 106/120
[51] Int. Cl.² ........................................ C04B 1/00
[58] Field of Search ........................... 106/120, 119

[56] References Cited
UNITED STATES PATENTS

| | | | |
|---|---|---|---|
| 2,766,131 | 10/1956 | Seipt | 106/120 |
| 3,501,324 | 3/1970 | Kubo | 106/120 |
| 3,794,505 | 2/1974 | Helser et al. | 106/120 |

*Primary Examiner*—J. Poer
*Attorney, Agent, or Firm*—Carl G. Staelin; John W. Overman; Patrick P. Pacella

[57] ABSTRACT

A method for building and maintaining the consistency of a hydrous calcium silicate product forming slurry is disclosed. The building of the consistency of the slurry is carried out by quiescing the slurry after it is formed. Maintaining the consistency of the slurry is accomplished by alternate periods of mixing and quiescing of the slurry.

7 Claims, No Drawings

METHOD OF BUILDING AND MAINTAINING SLURRY CONSISTENCY

This invention relates to a process for building and maintaining the consistency of a hydrous calcium silicate product forming slurry.

The term hydrous calcium silicate denotes a crystalline compound formed by the reaction of lime (CaO), silica ($SiO_2$), and water ($H_2O$). The two hydrous calcium silicates that generally are of interest are: tobermorite having the formula $4 CaO . 5 SiO_2 . 5 H_2O$; and zonolite, having the formula $5 CaO . 5 SiO_2 . X H_2O$. Hydrous calcium silicate products often are used as heat insulating materials.

The hydrous calcium silicate products are prepared from a molded aqueous slurry of reactive cementitious materials and reinforcing fibers. The cementitious materials, reinforcing fibers and water are mixed to form a slurry which then is cast into pans to impart a predetermined shape to the slurry and final product.

Methods for reacting and drying the molded aqueous slurry of reactive cementitious constituents and reinforcing fibers to form hydrous calcium silicate insulation products are known in the art. One such method includes placing a molded slurry of the reactive cementitious constituents and reinforcing fibers in an autoclave, introducing pressurized saturated steam into the autoclave to indurate the slurry, and removing the product from the autoclave. Another such method includes placing a molded slurry of the reactive cementitious constituents and reinforcing fibers in an autoclave, introducing pressurized saturated steam into the autoclave to indurate the slurry, simultaneously further indurating and drying the slurry with superheated steam to convert the slurry to a final product, reducing the pressure in the autoclave to atmospheric pressure, and removing the product.

In pan batch operations, the slurry of cementitious materials, reinforcing fibers and water is mixed in a hydrapulper and then transferred to a holding tank fitted with an agitator. The slurry is held in the tank until it is poured into a mold. When the batch mixer gets ahead in mixing the slurry or there is a mechanical or power failure and the slurry cannot be poured for a couple of hours, various problems can occur with the slurry not only in the mold, but also before the slurry gets to the mold.

Continuous mixing of the slurry in the holding tank results in a continuous drop off in consistency which in turn leads to a soupy slurry. Fiber length is reduced significantly if the slurry is mixed throughout these periods of time when the slurry cannot be poured. Reduced fiber length often results in lower product strength.

If a low consistency slurry is pumped through a pouring nozzle, i.e., a soupy material, problems such as air holes, pouring folds, slip planes and the like can arise. Once, the slurry is contained in the mold, low consistency results in particle settlement which shows up as not enough material (NEM) in the mold.

A soupy slurry also results in NEM by a shifting of the slurry in the mold due to bumping and jerking of the molds while still on the pouring line. Air entrapment creates visual and physical property defects in the final product.

We now have discovered a method of building and maintaining the consistency of the slurry. The building of the consistency of the hydrous calcium silicate product forming slurry is carried out by first mixing the cementitious materials, reinforcing fibers and water to form a slurry and then allowing the slurry to quiesce (gel) for 15 to 30 minutes. The consistency of the slurry then is maintained with alternate periods of mixing and quiescing of the slurry. These alternate periods of mixing and quiescing the slurry minimize the drop off of slurry consistency throughout holding periods such as occur over lunch breaks, coffee breaks, emergency shutdowns, shift changes and the like.

Accordingly, an object of this invention is to provide a method of building the consistency of a hydrous calcium silicate forming slurry.

Another object of this invention is to provide a method of building and controlling the consistency of a hydrous calcium silicate forming slurry.

Other objects, aspects and advantages of this invention will be apparent to one skilled in the art from the following disclosure and appended claims.

Consistency, as employed in this invention, is determined by the following procedure.

A brass cone 2¼ inches high which has an apex whose included angle is 45°, is provided with a lead screw that is rotated at 45 rpm, and is designed to drive the cone downwardly at a rate of 6 inches in 70 seconds. The cone and its drive mechanism is counterbalanced, and a scale is attached thereto for measuring the force that is required to drive the cone downwardly into a slurry. A sample of the slurry to be tested is placed in a beaker beneath the cone. The scales then are tared to zero. The apex of the cone is brought down upon the top surface of the slurry and the force necessary to drive the cone beneath the surface of the slurry is measured on the scales. It has been determined that a consistency between 150 to 300 units is required for the process of this invention. In asbestos-free slurries, the consistency generally ranges from 220 to 280 units. In asbestos-containing slurries, the consistency generally ranges from 180 to 220 unites. The consistency units employed herein are measured in grams on the scale.

In the method of this invention, the cementitious materials reinforcing materials and water are mixed in a hydrapulper to form a slurry. The slurry is transferred to a holding tank fitted with an agitator and preferably maintained at a temperature ranging from 60° to 90°F. In order to build the consistency of the slurry, the slurry is allowed to quiesce in the holding tank for a period of time ranging from 15 to 30 minutes. The slurry now is ready for use and, if possible, should be cast into pans, reacted and dried. Left to itself with no agitation, most slurries would suffer from desegregation, i.e., water rises to the top and solids settle to the bottom. Continuous agitation of the slurry results in a continuous drop off in consistency. When the slurry cannot be poured for a period of time, the consistency of the slurry is maintained with alternate periods of mixing and quiescing of the slurry. These alternate periods of mixing and quiescing minimize the drop off the slurry consistency through such holding periods.

Slurries of pan batches should be poured within 4 hours after mixing. Older slurries produce low strength ware since some crystal reaction occurs throughout the holding period. Agitation breaks the crystals and, once broken, they do not reform.

In the maintaining of the consistency with alternate mixing and quiescing, each mixing period ranges from 30 seconds to 10 minutes and each quiescing period ranges from 20 minutes to 2 hours. Preferably, each quiescing period ranges from 20 to 30 minutes.

While this invention was developed for pan batch, it can be applied to filter press operations if desired.

After building and maintaining the consistency of the slurry for a length of time, the slurry is placed in pan molds or filter press molds. In pan molds, the slurry remains in the mold while the cementitious materials are reacted to convert them to a hydrous calcium silicate insulation. A pan mold generally defines a mold cavity of a particular shape and dimension; e.g., a flat rectangular pan is used to form flat ware or blocks, while an arcuate, generally U-shaped mold forms half-section insulation pieces used to form molded pipe covering for insulating pipes, ducts, and the like.

One method for reacting and drying the slurry introduces pressurized saturated steam into a closed system or autoclave in sufficient amount to bring the pressure in the autoclave to 100 to 350 psi in 30 minutes after the introduction of the steam begins. (The term "pressure" as used herein refers to gauge pressure (in pounds per square inch), i.e. the pressure above that of the atmosphere).

The slurry then is maintained under this steam pressure in the autoclave for a period of time sufficient to indurate the slurry. After the product has been removed from the autoclave, it can be dried in an auxiliary drier, if required.

Another method for reacting and drying the slurry introduces pressurized, saturated steam into a closed system or autoclave in sufficient amount to bring the pressure in the autoclave to 100 to 350 psi in 30 minutes or less and preferably within 15 to 30 minutes after the introduction of the steam begins. (The term pressure as used herein refers to gauge pressure (in pounds, per aquare inch), i.e. the pressure above that of the atmosphere.) After introduction of the steam, the temperature in the autoclave is raised by heating coils to temperatures ranging from about 407° to about 600°F to produce the superheated steam.

The slurry is then maintained in the autoclave until a predetermined percentage of the moisture (by weight) of the ware has been removed by evaporation into the superheated steam atmosphere. While continuing to circulate the steam in the system, the pressure in the autoclave is reduced to atmosphere conditions within 60 minutes or less and the final product is removed. The product subsequently can be dried in an auxiliary drier, if required.

The specific lime to silica ratio of the slurry is dependent primarily upon the desired type of crystalline hydrous silicate desired in the final product. For example, if it is desired to obtain a crystalline product predominantly composed of a crystalline matrix structure of the type commonly referred to as xonotlite (5 CaO . 5 $SiO_2$ . $H_2O$), a $CaO/SiO_2$ mol ratio of approximately 1/1 would be utilized in the slurry. If the desired crystalline product is tobermorite having the formula 4 CaO . 5 $SiO_2$ . 5 $H_2O$, a $CaO/SiO_2$ mol ratio ranging from 0.75/1 to 0.80/1 would be employed in the slurry. In general, the $CaO/SiO_2$ molar ratio ranges from 0.65/1 to 1.3/1.

Control of the density of the resultant pan product is primarily accomplished by controlling the relative amount of water utilized in the make-up of the slurry. For example, an apparent density of 11 pounds per cubic foot, which may be considered a nominal apparent density, would be obtained utilizing a slurry having a ratio of water to total dry solids of approximately 6:1.

The siliceous materials employed in this invention include tripoli, portland cement, siliceous sand, quartz, diatomaceous earth, clays, silica gel, pozzolana, perlite, and the like and mixtures thereof.

The reinforcing fibers of this invention include glass fibers, mineral wool, asbestos, organic materials and the like.

The organic materials of this invention are cellulosic fibers such as fibers of wood pulp, cotton, straw, bagasse, wood flour, hemp, rayon, coir, and the like. A preferred pulp fiber is bleached softwood pulp.

Alkali resistant glass fibers that can be employed include those disclosed in British Patent Specification Nos. 1,243,972 and 1,290,528 and in U.S. patent application Ser. No. 275,613 filed on July 27, 1972. The $ZrO_2$ and $TiO_2$ containing compositions described in application Ser. No. 275,613 provide a unique combination of alkali-resistance, low liquidus temperature and desirable viscosity for the fiberization of glass compositions and for the reinforcement of cementitious materials. The glass compositions of application Ser. No. 275,613 have the following range or proportions by weight: $SiO_2$, 60 to 62%; CaO, 4 to 6%, $Na_2O$, 14 to 15%; $K_2O$, 2 to 3%; $ZrO_2$, 10 to 11%; and $TiO_2$, 5.5 to 8%.

The reinforcing fibers generally have a fiber diameter of 30 microns or less, as in the case of cotton fibers, and may average less than 1 micron in fiber diameter as in the case of wood pulp. Glass fibers will generally have a diameter of less than 0.001 inch and have a length of from 0.25 to 2.0 inch, desirably from 0.5 to 1.25 inch, and preferably from 0.625 to 1.00 inch.

The amount of reinforcing fibers can vary widely. Generally, the amount of reinforcing fibers ranges from 0.1 to 30 percent by weight of solids.

Specific composites and process embodying the principles of this invention are set forth in the following examples:

EXAMPLE I

| Materials (Pan Batch) | Dry Weight Percent |
|---|---|
| Glass fiber | 1.4 |
| Wood fiber | 8.5 |
| Quicklime | 32.0 |
| Silica Flour | 22.0 |
| Diatomaceous Earth | 16.1 |
| Fillers, clay and calcium carbonate | 7.7 |
| Calcium Silicate Dust | 9.7 |
| Sodium Silicate | 2.6 |
| | 100.0 |
| Calcium/silica ratio | 0.78/1 |
| Water/solids ratio | 6/1 |
| Design density, pcf | 11 |

An aqueous dispersion of the above materials was made in a hydrapulper with the above water-to-solids ratio and then transferred to a holding tank. The consistency of the resulting slurry, as determined by the procedure described earlier in the specification, was in the range of 190 to 200 units. Other consistency determinations referred to herein also were measured by the procedure described earlier in the specification.

EXAMPLE II

The slurry of Example I was allowed to quiesce for 15 minutes. The consistency was found to be approximately 280 units.

EXAMPLE III

A slurry was prepared according to the procedures of Example I. After mixing, the consistency was 140 units. The slurry was allowed to quiesce for 30 minutes and the consistency was 220 units. This slurry then was subjected to alternate periods of 30 seconds of mixing and 29.5 minutes of quiescing for 2½ hours. The consistency of the slurry slowly dropped over this period of time from 220 to 200 units.

EXAMPLE IV

A slurry was prepared according to the procedures of Example I. After mixing, the consistency was 130 units. The slurry was allowed to quiesce for 18 minutes and the consistency was found to be 220 units. The slurry then was subjected to alternate periods of 10 minutes of mixing and 20 minutes of quiescing for 2½ hours. The consistency of the slurry dropped from 220 to 180 units over this time period.

EXAMPLE V (Control)

A slurry was prepared according to the procedure of Example I. After mixing, the slurry had a consistency of 120 units. The slurry was allowed to quiesce for 20 minutes and the consistency was found to be 180 units. The slurry then was subjected to continuous mixing for 2½ hours. After the first 30 minutes of mixing the consistency of the slurry dropped to 100 units and after 2½ hours of continuous mixing the consistency of the slurry was 80 units.

A comparison of Examples I and II reveals the marked improvement in building consistency achieved by allowing the slurry to quiesce for 15 to 30 minutes after the slurry is first formed. Examples II to IV also reveal this improvement in building consistency. A comparison of Examples II to IV with Example V reveals the marked improvement in maintaining consistency achieved by subjecting the slurry to alternate periods of mixing and quiescing.

While the invention has been described in considerable detail, we do not wish to be limited to the particular embodiments shown and described, and it is our intention to cover hereby all novel adaptations, modifications and arrangements thereof which come within the practice of those skilled in the art to which the invention relates.

We claim:

1. A method of building and maintaining the consistency of a hydrous calcium silicate insulation product forming aqueous slurry of calcareous and siliceous materials stabilized with reinforcing fibers, the method comprising allowing the slurry to quiesce for a period of time ranging from 15 to 30 minutes after initial formation of the slurry, and then subjecting the slurry to alternate periods of mixing and quiescing wherein, in the alternate periods of mixing and quiescing, each mixing period ranges from 30 seconds to 10 minutes and each quiescing period ranges from 20 minutes to 2 hours.

2. A method according to claim 1 wherein, in the alternate periods of mixing and quiescing, each quiescing period ranges from 20 to 30 minutes.

3. A method according to claim 1 wherein the alternate periods of mixing and quiescing are carried out over a period of time ranging from 30 minutes to 4 hours.

4. A method according to claim 1 wherein the consistency is maintained in a range from 150 to 300 units.

5. A method according to claim 1 wherein the consistency is maintained in a range from 220 to 280 units.

6. A method according to claim 1 wherein the aqueous slurry of calcareous and siliceous materials has a $CaO/SiO_2$ molar ratio ranging from 0.65/1 to 1.3/1 and is stabilized with 0.1 to 30.0 percent by weight of solids of the reinforcing fibers.

7. A method according to claim 1 wherein the reinforcing fibers are glass fibers and wood fibers.

* * * * *